Dec. 13, 1938.　　　W. LINDENBERG　　　2,139,759
DOUBLE EXPOSURE PREVENTION CAMERA

Filed Sept. 23, 1937

Wilhelm Lindenberg
INVENTOR.

BY

ATTORNEYS

Patented Dec. 13, 1938

2,139,759

UNITED STATES PATENT OFFICE 2,139,759

DOUBLE EXPOSURE PREVENTION CAMERA

Wilhelm Lindenberg, Stuttgart, Germany, assignor to Eastman Kodak Company, Rochester, N. Y., a corporation of New Jersey Application September 23, 1937, Serial No. 165,358
In Germany February 25, 1937

9 Claims. (Cl. 95—32)

This invention relates to photography and more particularly to the prevention of double exposures in roll holding protographic cameras.

One object of my invention is to provide a camera with a film winding mechanism and a shutter trigger mounted on the camera body which are interconnected in such a way that each must be operated in turn for making an exposure and to provide a means for disconnecting the mechanism when the camera is folded. Another object of my invention is to provide a lever on the camera body which is bodily movable to and from positions in which it serves to perform various latching functions. Another object of my invention is to provide a folding camera with mechanism which is operated as the camera is unfolded, to position parts for picture taking. Still another object of my invention is to provide a camera in which the film winding mechanism and the shutter actuating mechanism may be latched against movement at the proper time and released for movement when the parts are properly positioned, and other objects will appear from the following specification, the novel features being particularly pointed out in the claims at the end thereof.

Coming now to the drawing wherein like reference characters denote like parts throughout:

In roll holding cameras, it is desirable to be able to wind the film without referring to the red window in the camera back to determine when a fresh area of film has been wound into place. It is also desirable to have a winding knob which may be turned until it reaches a definite stop in winding a fresh area of film into position and to have this stop mechanism released after an exposure has been made so that it can be again operated.

In many of the modern cameras the shutter release is placed on the camera body. With the mechanism which will be hereinafter described, means is provided for latching the release member in a seat in the camera body in an inaccessible position when the camera is not in use and to project the shutter member from the camera when the camera is unfolded.

Figure 2:
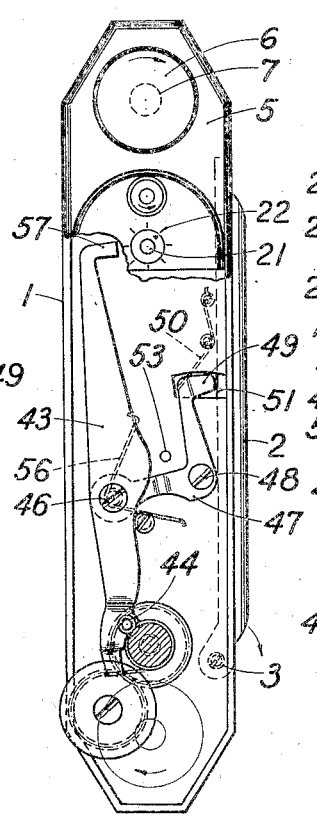
Fig. 2 is a view similar to Fig. 1 but with the parts in a somewhat different position and with a portion of the cover plate shown in elevation.
Figure 5:
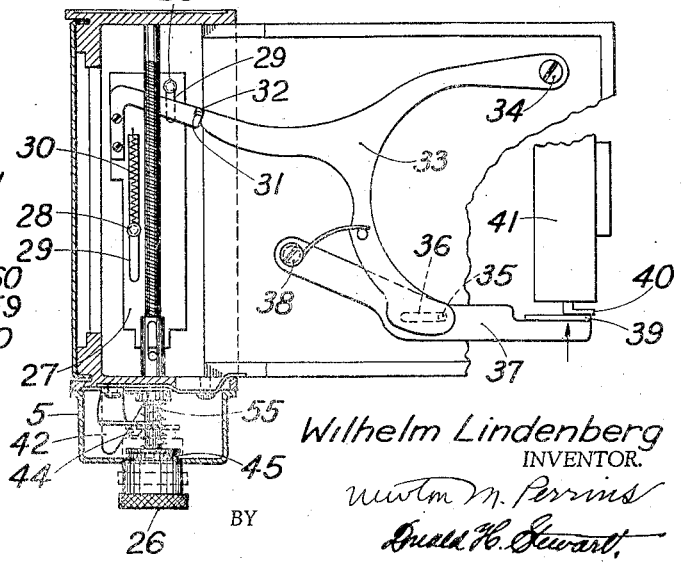
Fig. 5 is a section through the camera shown in the preceding figures, showing the mechanism for actuating the shutter trigger, as well as the relationship of this mechanism with the end of the main operating lever.

As a typical embodiment of my invention, I have provided a camera body 1, to which a bed 2 may be hinged upon a hinge pintle 3 to swing from a folded position, shown in Fig. 2, to an unfolded or open picture-taking position, as shown in Fig. 5. The mechanism for controlling the camera winding and film exposure may be all placed on one end wall 4 of the camera, this wall being normally covered by means of a cover plate 5, partially shown in Fig. 2.

The film winding is accomplished by turning a knob 6, carried by a shaft 7, to which there is affixed a ratchet wheel 8. Engaging this ratchet is a pawl 9, pivotally mounted on a stud 10 carried by the camera body and pressed by a spring 11 into engagement with the ratchet 8. However, the pawl can only engage the ratchet 8 when the rounded portion 12 of the pawl lies in a complementary-shaped recess 13, carried by a disk 14, which is mounted to rotate upon a shaft 15 and which is provided with a pair of spaced pins 16 and 17 which project upwardly from the disk.

Pin 17 is adapted to successively engage the various notches 18 in the starwheel 19, so that at each revolution of the disk 14, the starwheel will be moved one revolution. This starwheel is carried on a shaft 20 which also carries a movable dial 21 on the outside of the housing 5 to indicate, on a suitable scale 22, the number of exposures which have been made.

Figure 3:
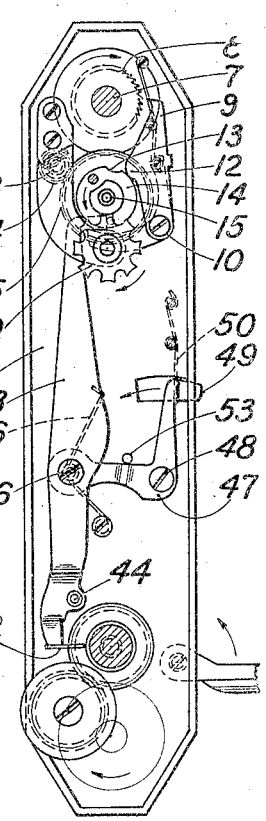
Fig. 3 is a view similar to the preceding figures but with the parts in a somewhat different position.

Thus, when the film is to be wound, the pawl 9 must lie out of engagement with the ratchet teeth 8, as indicated in Fig. 3, so that the knob 6 may be turned in the direction shown by the arrow. This rotation of the knob rotates the shaft 7, to which a suitable key is connected, this key engaging, in turn, the spool on which the film is to be wound. As the film is wound, it passes over a measuring roll 23 which may be provided with pins or teeth to prevent slippage, if desired. This measuring roll 23 is connected to a pinion 24, meshing with a gear 25 carried by the shaft 15, so that the disk 14 is turned during the winding operation. The pinion 24 and gear 25 are so selected with regard to the number of teeth that the disk 14 may make one revolution each time a fresh area of film is wound into place. As soon as the required quantity of film is wound, the notch 13 will come opposite the protuberance 12 on the pawl and the pawl will drop into the ratchet, thus locking the film against further movement.

In order to make an exposure, the knurled knob 26, best shown in Fig. 5, is pressed from the full line to the broken line position. This operation actuates the shutter by moving the slidable plate 27 upon its supporting studs 28 which pass through slots 29 in the plate against the action of the spring 30, so that the upturned flange 31, through engagement with the upturned flange 32 of the Y-shaped lever 33, may cause this lever to swing on the stud 34, so that a pin 35, carried by the lever and engaging a slot 36 of an actuating lever 37, may actuate the shutter in the following manner:

Lever 37 is carried upon a stud 38 so that when the lever 33 swings it, the upwardly-turned flange 39 will be moved in the direction shown by the arrow to actuate the trigger 40 of a shutter 41. This mechanism is quite similar to the shutter actuating mechanism shown in the patent of August Nagel, No. 2,085,468, granted June 29, 1937. The structure need not be further described, since the connecting means per se between the camera body and the shutter forms no part of the present invention.

It should be noted that when the knob 26 is pushed inwardly to make an exposure, the edge of the knob will engage a wedge-shaped upstanding flange 42 which is carried on the end of a main operating lever 43. This lever likewise carries an upstanding headed stud 44, the purpose of which will now be described.

The headed stud 44 is adapted to engage in the annular notch 45 of member 26 when the lever 43 is positioned as shown in Fig. 2. It should be noted from this figure that the lever 43 is carried on a stud 46, which is in turn carried on a bell-crank lever 47, pivoted to a stud 48, carried by the side wall 4 of the camera. This bell-crank lever carries an arm 49 which is normally pressed by a spring 50 toward the position shown in Fig. 1. However, since the arm 49 lies in the path of the camera bed 2, it will be struck by an edge 51 of the bed and moved to the position shown in Fig. 2 when the bed is swung to its closed or folded position.

The movement of the bell-crank lever is limited by a stop 53 and the bell-crank lever always lies against this stop when the camera bed has been opened to position the camera for picture taking.

However, when the bell-crank lever has been moved against the pressure of spring 50 by the bed, as shown in Fig. 2, the headed stud 44 is adapted to engage the annular groove 45 of the button 26 when the latter is pushed inwardly against the pressure of the spring 55. This is the broken line position in Fig. 5, in which the trigger member 26 is definitely latched against movement in a relatively inaccessible position in which it lies chiefly within the housing 5.

Thus, when the camera is folded, the trigger is latched by pressing it inwardly so that it cannot again be actuated until the camera is opened. It should also be noted that since the lever 43 has been bodily moved by the bell-crank lever 47, the end of this lever lies out of its operative relationship with the disk 14, as will now be described.

Figure 1:
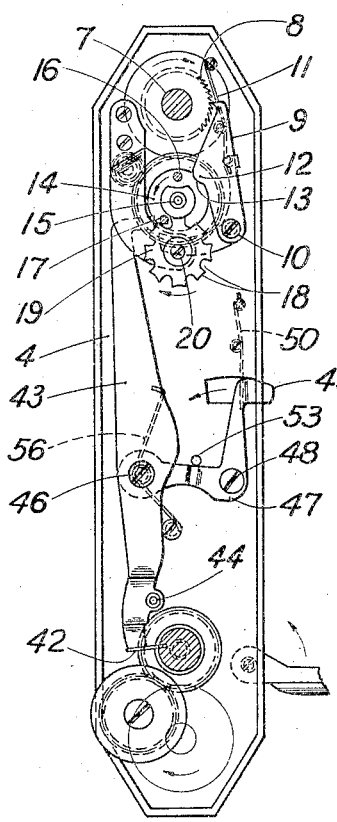
Fig. 1 is a side elevation, parts being shown in section, of a roll holding camera constructed in accordance with and embodying a preferred form of my invention, the side cover plate being removed to expose parts of the camera mechanism.
Figure 4:
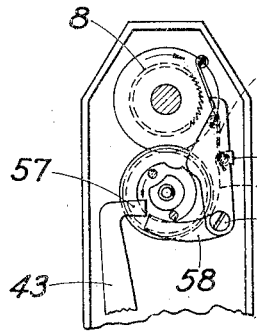
Fig. 4 is a fragmentary side elevation of a portion of the film latching and releasing mechanism.

When the camera bed is opened and the bell-crank lever moves arm 43 through the impulse of spring 50 and spring 56, the bell-crank lever will be bodily moved so that the stud 44 no longer engages the annular notch 45, thus permitting the trigger 26 to spring outwardly under the impulse of spring 55. Thus, the trigger is automatically positioned as the bed opens. As the lever 43 is swung upwardly, the arm 57 of the lever is brought into the position shown in Fig. 1. If the parts are in position for exposure, as indicated in Fig. 1, the trigger 26 should next be pressed. By pressing this member an exposure is made and the wedge-shaped arm 42 of the lever 43 engages an edge of the trigger 26 so that the arm is turned about its pivot 46. This movement causes the arm 57 to move to the right with respect to Fig. 1, and since it engages the pin 17, it turns the disk 14 in a counterclockwise position a distance sufficient to raise the pawl 9 from the ratchet 8, as shown in Fig. 3. Thus, the actuation of the trigger releases the film latch and permits the knob 6 to be again turned to wind a fresh exposure area into place. However, the latch 43 is prevented from moving a second time if an attempt should be made to press the trigger before a fresh area of film is wound into place by means of a hinged blocking member 58, which is pivoted on the stud 10 and which carries an upstanding arm 59 which is pressed by the spring 11 in a counter-clockwise direction, so that an upstanding flange 60 will engage the edge of the pawl 9. Thus, when the pawl is moved out of engagement with the ratchet 8 as indicated in Fig. 4, the blocking member 58 projects in the path of the arm 57 of the lever 43, so that this arm cannot be moved in a clockwise direction. Since this is the case, the wedge-shaped member 42 remains stationary and forms a stop, preventing the movement of the shutter trigger 26. It is therefore necessary to continue to turn the knob 6 to the point where the pawl 9 may be permitted to drop into the ratchet 8, so that the blocking member 58 will be moved away from the path of the arm 57. This position is shown in Fig. 1, in which the film has just been wound and the camera parts are in position for exposure.

The operation of this shutter is extremely simple and is substantially foolproof, since it is only possible for an operator to wind film at the proper time and to press the shutter trigger at the proper time, and neither can be so operated as to produce either no exposure at all or double exposures. It will also be seen that the shutter trigger may be held in an inaccessible position as long as the camera is folded, and that upon opening the camera to make an exposure, the trigger is automatically projected into position for use.

While I have shown a preferred embodiment of my invention, it is obvious that the film winding and shutter actuating parts may take different forms, and I consider as within the scope of my invention, all such forms as may come within the scope of the appended claims.

What I claim as my invention and desire to be secured by Letters Patent of the United States is:

1. In a folding roll holding camera, the combination with a camera body, of a film winding mechanism including a measuring roll and latch carried thereby, a shutter trigger mounted on the camera body, a movably mounted lever adapted to cooperate with the trigger and film winding mechanism and to be moved by the trigger to release the film winding mechanism latch, a movably mounted blocking lever carried by the latch mechanism movable to and from a position to block movement of the lever connecting the film winding mechanism and trigger, whereby movement of the trigger may be prevented.

2. In a folding roll holding camera, the combination with a camera body, of a film winding mechanism including a measuring roll and latch carried thereby, a shutter trigger mounted on the camera body, a movably mounted lever adapted to cooperate with the trigger and film winding mechanism, a wedge-shaped cam on an end of the lever adjacent the trigger, and means for moving the lever and cam from the trigger to release the film winding mechanism latch.

3. In a folding roll holding camera, the combination with a camera body, of a film winding mechanism including a measuring roll and latch carried thereby, a shutter trigger mounted on the camera body, a camera bed pivotally attached to the camera body having an arm adapted to project into the path of the bed as it moves about its pivotal support, a lever pivoted to the first mentioned lever, a cam carried at one end of said lever, a trigger movably mounted on the camera body for releasing a camera shutter, said cam being movable into a position to engage said movable trigger by opening the camera bed to a picture-taking position.

4. In a folding roll holding camera, the combination with a camera body, of a film winding mechanism including a measuring roll and latch carried thereby, a shutter trigger mounted on the camera body, a camera bed pivotally attached to the camera body, a pivoted lever carried by the camera body having an arm adapted to project into the path of the bed as it moves about its pivotal support, a lever pivoted to the first mentioned lever, a cam carried at one end of said lever, a trigger, an axially slidable shaft carrying the trigger whereby the trigger may engage the cam and move the cam carrying lever, and means actuated by moving the bed to a closed position and including the first mentioned lever for swinging the cam out of the path of the trigger when the bed is moved.

5. In a folding roll holding camera, the combination with a camera body, of a film winding mechanism including a measuring roll and latch carried thereby, a shutter trigger mounted on the camera body, a camera bed pivotally attached to the camera body having an arm adapted to project into the path of the bed as it moves about its pivotal support, a lever pivoted to the first mentioned lever, a cam carried at one end of said lever, a trigger, an axially slidable shaft carrying the trigger whereby the trigger may engage the cam and move the cam carrying lever, a latch element carried by the trigger, a latch element carried by the lever near the cam thereon, said latch elements being so positioned that closing movement of the bed may swing said cam carrying lever to position said latch elements for engagement.

6. In a folding roll holding camera, the combination with a camera body, of a film winding mechanism including a measuring roll and latch carried thereby, a shutter trigger mounted on the camera body, a camera bed pivotally attached to the camera body having an arm adapted to project into the path of the bed as it moves about its pivotal support, a lever pivoted to the first mentioned lever, a cam carried at one end of said lever, a trigger, an axially slidable shaft carrying the trigger whereby the trigger may engage the cam and move the cam carrying lever, a latch element carried by the trigger, a latch element carried by the lever near the cam thereon, said latch elements being so positioned that closing movement of the bed may swing said cam carrying lever to position said latch elements for engagement by axially moving the trigger on the camera, and a spring for moving the trigger from a latched position upon an opening movement of the bed.

7. In a folding roll holding camera, the combination with a camera body, of a film winding mechanism including a measuring roll and latch carried thereby, a shutter trigger mounted on the camera body, a movably mounted lever adapted to cooperate with the trigger and film winding mechanism and to be moved by the trigger to release the film winding mechanism latch, means carried by the film winding mechanism latch for blocking movement of the trigger through said lever, a film winding knob on the camera casing and included in the film winding mechanism and adapted to remove the blocking member from the path of said lever.

8. In a folding roll holding camera, the combination with a camera body, of a film winding mechanism carried thereby including a measuring roll, a notched disk geared thereto, a pawl latch element including a projection adapted to engage said notch, a film winding shaft, a ratchet carried thereby adapted to form with the pawl a latch, means for turning the notched disk to release the latch elements including a pivoted lever, a trigger, and a cam connection between the trigger and cam for moving the latter from the former.

9. In a folding roll holding camera, the combination with a camera body, of a film winding mechanism carried thereby including a measuring roll, a notched disk geared thereto, a pawl latch element including a projection adapted to engage said notch, a film winding shaft, a ratchet carried thereby adapted to form with the pawl a latch, means for turning the notched disk to release the latch elements including a pivoted lever, a trigger, and a cam connection between the trigger and cam for moving the latter from the former, a bed hingedly mounted on the camera and movable to and from a folded or closed position, and means for supporting the pivoted lever movable by closing the bed for bodily moving the lever to render the same inoperative.

WILHELM LINDENBERG.